US010900564B2

(12) United States Patent
Sinka et al.

(10) Patent No.: US 10,900,564 B2
(45) Date of Patent: Jan. 26, 2021

(54) DRIVETRAIN ASSEMBLY HAVING A SHIFT MECHANISM

(71) Applicant: ArvinMeritor Technology, LLC, Troy, MI (US)

(72) Inventors: Aaron Sinka, Rochester Hills, MI (US); Matthew Starna, New Baltimore, MI (US); Matthew Jones, Waterford, MI (US); Aleksey Khoryshev, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 605 days.

(21) Appl. No.: 15/802,537

(22) Filed: Nov. 3, 2017

(65) Prior Publication Data

US 2019/0136972 A1    May 9, 2019

(51) Int. Cl.
| | |
|---|---|
| *F16H 63/18* | (2006.01) |
| *F16H 63/30* | (2006.01) |
| *B60K 23/08* | (2006.01) |
| *F16H 61/24* | (2006.01) |

(52) U.S. Cl.
CPC ......... *F16H 63/18* (2013.01); *B60K 23/0808* (2013.01); *F16H 61/24* (2013.01); *F16H 63/30* (2013.01); *F16H 63/3069* (2013.01); *F16H 2061/243* (2013.01); *F16H 2063/3073* (2013.01); *F16H 2063/3079* (2013.01)

(58) Field of Classification Search
CPC ...... F16H 63/18; F16H 63/30; F16H 63/3069; F16H 2063/3073; F16H 2063/3079
USPC ................................................ 74/335, 337.5
See application file for complete search history.

(56) References Cited

U.S. PATENT DOCUMENTS

| | | | |
|---|---|---|---|
| 4,377,951 A | 3/1983 | Magg et al. | |
| 4,449,416 A | 5/1984 | Huitema | |
| 4,529,080 A * | 7/1985 | Dolan ..................... | F16H 63/32 |
| | | | 192/109 A |
| 4,531,423 A | 7/1985 | Fogelberg | |
| 4,704,917 A | 11/1987 | Hiroyasu | |
| 4,770,280 A | 9/1988 | Frost | |
| 4,785,681 A | 11/1988 | Kuratsu et al. | |
| 5,609,540 A | 3/1997 | Brissenden et al. | |
| 5,713,243 A | 2/1998 | Williams et al. | |
| 6,450,057 B1 | 9/2002 | Winkler et al. | |

(Continued)

FOREIGN PATENT DOCUMENTS

| | | |
|---|---|---|
| CN | 1849477 A | 10/2006 |
| DE | 102010026359 A1 | 1/2012 |

(Continued)

OTHER PUBLICATIONS

European Patent Office, Extended European Search Report for corresponding European Application No. 18191139.7-1012, dated Feb. 12, 2019.

(Continued)

*Primary Examiner* — Ha Dinh Ho
(74) *Attorney, Agent, or Firm* — Brooks Kushman PC

(57) ABSTRACT

A drivetrain assembly having a shift mechanism. The shift mechanism may include a shift rail, a first shift assembly, a second shift assembly, and a sector cam. The shift rail may be fixedly disposed on a housing. The sector cam may control movement of the first shift assembly and the second shift assembly.

20 Claims, 6 Drawing Sheets

(56) References Cited

U.S. PATENT DOCUMENTS

| | | | |
|---|---|---|---|
| 6,602,159 B1 * | 8/2003 | Williams | B60K 17/3462 |
| | | | 180/247 |
| 6,619,153 B2 * | 9/2003 | Smith | F16H 63/32 |
| | | | 74/337.5 |
| 6,974,400 B2 * | 12/2005 | Williams | B60K 17/3462 |
| | | | 180/247 |
| 7,004,875 B2 * | 2/2006 | Williams | B60K 23/08 |
| | | | 192/38 |
| 7,240,577 B2 | 7/2007 | Choi et al. | |
| 2002/0139215 A1 | 10/2002 | Smith et al. | |
| 2011/0138959 A1 | 6/2011 | Wild et al. | |
| 2015/0059508 A1 | 3/2015 | Ekonen et al. | |

FOREIGN PATENT DOCUMENTS

| KR | 10-2012-0062329 A | 6/2012 |
|---|---|---|
| TW | 200740633 A | 11/2007 |

OTHER PUBLICATIONS

Australian Government—IP Australia, Examination Report No. 1 for Australian patent application No. 2018211250, dated May 17, 2019.

Intellectual Property India, Examination Report for corresponding Indian Application No. 201814029280, dated Nov. 27, 2019.

Chinese Office Action dated Feb. 3, 2020, for related Chinese Appln. No. 201810926912.X; 10 Pages.

European Patent Office, Extended European Search Report for corresponding European Application No. 18191139.7-1012, dated Aug. 14, 2020.

Second Chinese Office Action dated Jul. 9, 2020, for related Chinese Appln. No. 201810926912.X; 20 Pages.

Chinese Office Action dated Nov. 27, 2020, for related Chinese Appln. No. 201810926912.X; 12 Pages.

* cited by examiner

Fig-3

DRIVETRAIN ASSEMBLY HAVING A SHIFT MECHANISM

TECHNICAL FIELD

This application relates to a drivetrain assembly having a shift mechanism.

BACKGROUND

A transfer case having a shift mechanism is disclosed in U.S. Patent Publication No. 2015/0059508.

SUMMARY

In at least one embodiment, a drivetrain assembly is provided. The drivetrain assembly may have a housing and a shift mechanism. The shift mechanism may include a shift rail, a first shift assembly, a second shift assembly, and a sector cam. The shift rail may be fixedly disposed on the housing. The first shift assembly and the second shift assembly may be movable along a shift rail axis with respect to the shift rail. The sector cam may be rotatable about a sector cam axis and may control movement of the first shift assembly and the second shift assembly.

In at least one embodiment, a drivetrain assembly is provided. The drivetrain assembly may include a housing and a shift mechanism. The shift mechanism may be disposed in the housing and may include a shift rail, a first shift assembly, a second shift assembly, and a sector cam. The shift rail may be fixedly disposed on the housing. The first shift assembly may be movable along a shift rail axis with respect to the shift rail. The first shift assembly may have a first shift fork and a first biasing member. The first biasing member may bias the first shift fork in a first direction along the shift rail axis. The second shift assembly may be movable along the shift rail axis with respect to the shift rail. The second shift assembly may have a second shift fork and a second biasing member. The second biasing member may bias the second shift fork in a second direction along the shift rail axis. The sector cam may be rotatable about a sector cam axis and may be configured to actuate the first shift assembly and the second shift assembly.

BRIEF DESCRIPTION OF THE DRAWINGS

FIG. 3 is a side view illustrating the shift mechanism in a first position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
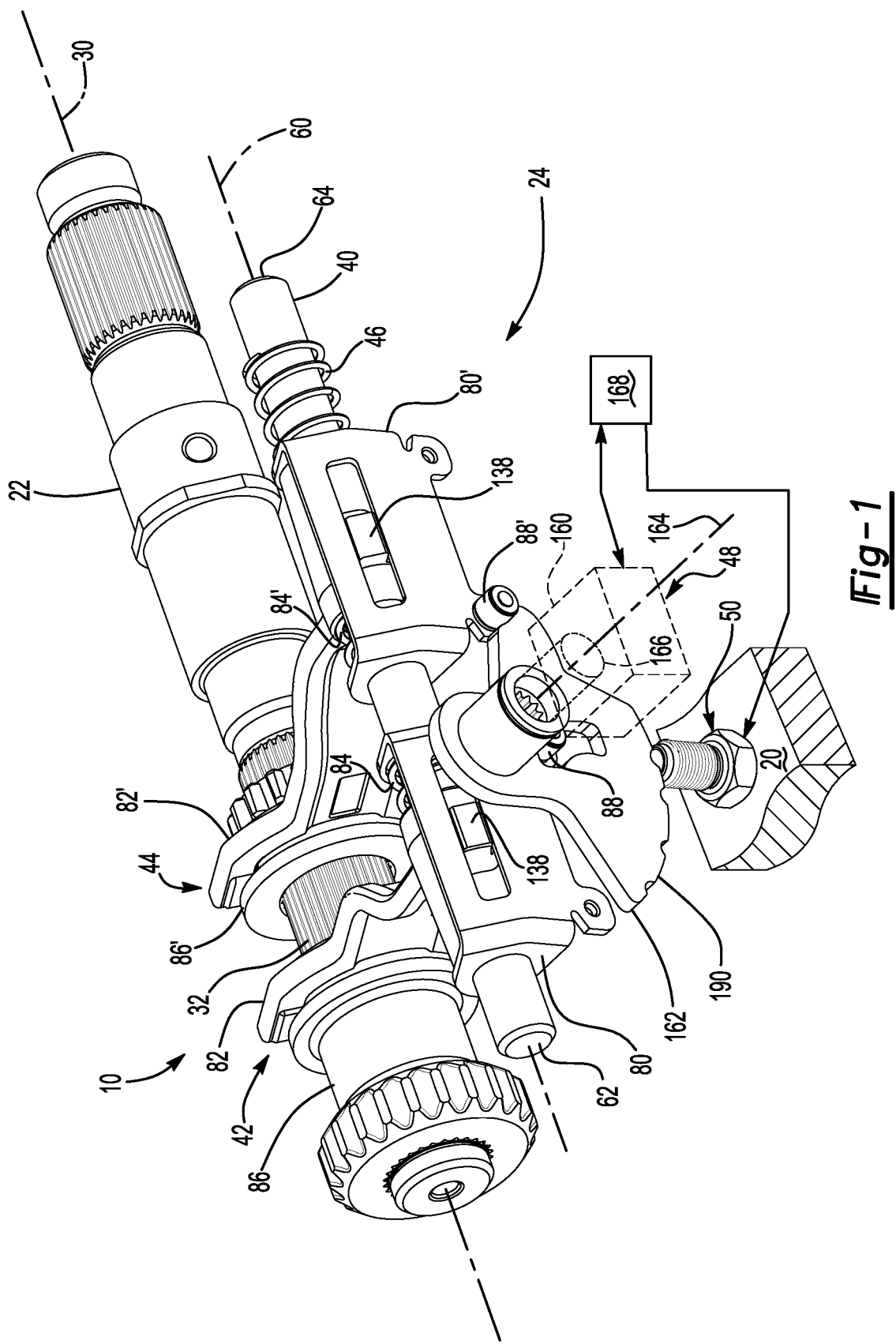
FIG. 1 is a fragmentary perspective view of a portion of a drivetrain assembly having a shift mechanism.

Referring to FIG. 1, a portion of an example of a drivetrain assembly 10 is shown. The drivetrain assembly 10 may be provided with a motor vehicle, such as a motor vehicle like a truck, bus, farm equipment, military transport or weaponry vehicle, or cargo loading equipment for land, air, or marine vessels.

The drivetrain assembly 10 may be part of a drivetrain of a vehicle. In at least one configuration, the drivetrain assembly 10 may provide torque to one or more vehicle traction wheels, control the distribution of torque to one or more vehicle traction wheels, or combinations thereof. The drivetrain assembly 10 may be configured as a transfer case in one or more embodiments.

The drivetrain may include at least one power source. A power source may provide power or torque that may be used to rotate one or more traction wheels. In at least one embodiment, a power source may be configured as an internal combustion engine that may be adapted to combust any suitable type of fuel, such as gasoline, diesel fuel, or hydrogen. It is also contemplated that a power source could be an electric power source, such as a battery, capacitor, or fuel cell, or a non-electric power source, such as a hydraulic power source. Multiple power sources could be provided, such as may be employed with a hybrid vehicle. As an example, the power source(s) may be operatively coupled to an input of a transmission. An output of the transmission may be operatively coupled to an input of the drivetrain assembly 10, such as with a drive shaft.

One or more outputs of the drivetrain assembly 10 may be selectively coupled to one or more sets of vehicle traction wheels. As such, the drivetrain assembly 10 may provide torque to a single set of vehicle traction wheels or multiple sets of vehicle traction wheels to provide a multi-wheel or all-wheel drive (AWD) operation mode. For convenience in reference, the term "two-wheel drive" is used to refer to operating modes in which the drivetrain assembly 10 may provide torque to a single set of vehicle traction wheels, such as may be associated with a single axle assembly and "four-wheel drive" is used to refer to operating modes in which the drivetrain assembly 10 may provide torque to multiple sets of vehicle traction wheels, such as may be associated with multiple axle assemblies. In addition, the drivetrain assembly 10 may have multiple drive gear ratios that may modify the torque provided to one or more vehicle traction wheels.

Figure 2:
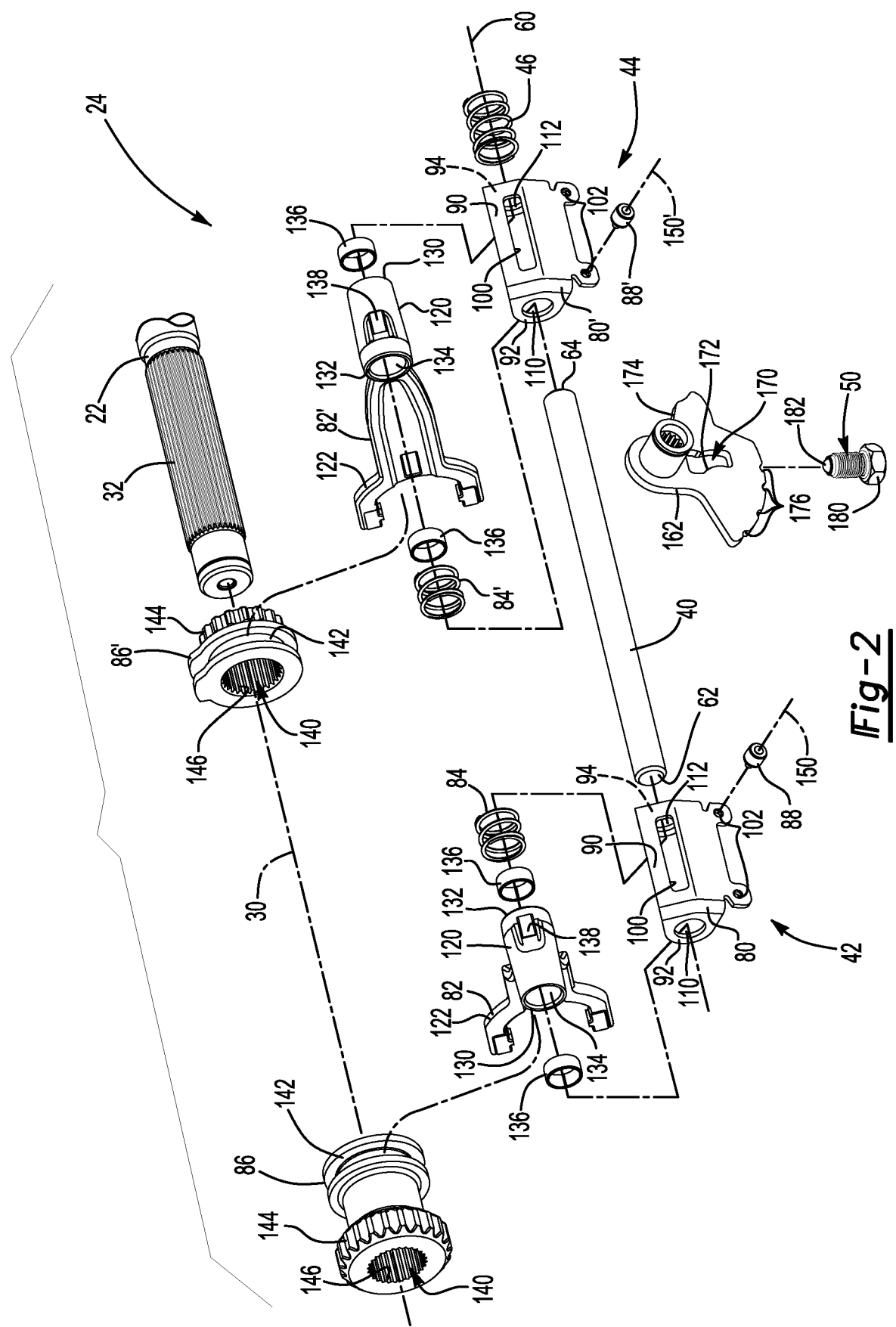
FIG. 2 is an exploded view of the shift mechanism.
Figure 3:
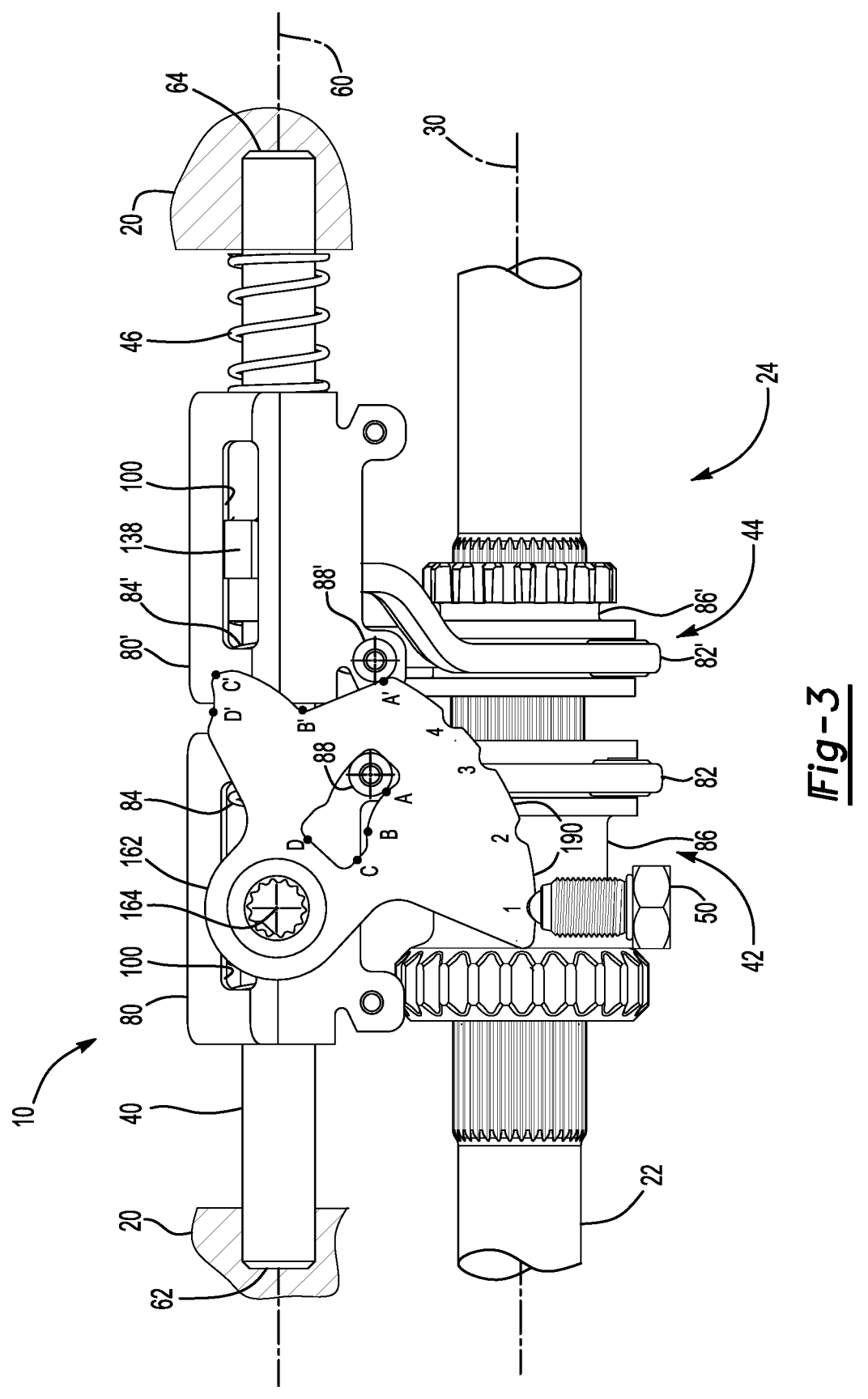

Referring to FIGS. 1-3, various components of the drivetrain assembly 10 are shown in more detail. The drivetrain assembly 10 may include a housing 20, a shaft 22, and a shift mechanism 24.

Referring to FIG. 3, the housing 20 may be provided to receive various components of the drivetrain assembly 10. In addition, the housing 20 may facilitate mounting of the drivetrain assembly 10 to the vehicle.

Referring to FIGS. 1-3, the shaft 22 may be rotatably disposed in the housing 20. The shaft 22 may extend along and may be rotatable about a first axis 30 and may have at least one spline 32. The spline 32 may be disposed along a portion of the exterior surface or outside diameter of the shaft 22. The teeth of the spline 32 may extend generally parallel to the first axis 30 to facilitate sliding movement of at least one shift collar along the shaft 22 as will be described in more detail below.

The shaft 22 may be operatively connected to and may receive torque from the power source. For instance, the shaft 22 may receive torque from an input shaft that may be provided with the drivetrain assembly 10. For example, the shaft 22 may be selectively coupled to an input shaft that may be operatively connected to the power source. For instance, a first shift collar may be actuated to a neutral position to disconnect the input shaft from the shaft 22 or actuated to one or more engaged positions in which torque may be transmitted from the input shaft to the shaft 22, such as a low range gear ratio and a high range gear ratio as is discussed in more detail below. In at least one configuration, a planetary gear set may be provided to connect or transmit torque from the input shaft to the shaft 22. In such a configuration, the first shift collar may engage the planet gear carrier and disengage from the sun gear to provide a low range gear ratio and may engage the sun gear and disengage from the planet gear carrier to provide a high range gear ratio.

Referring to FIGS. 1-3, the shift mechanism 24 may control engagement of a drive gear ratio and an operating mode, such as a wheel drive mode or a differential locking/unlocking mode. In at least one embodiment, the shift mechanism 24 may include a shift rail 40, a first shift assembly 42, a second shift assembly 44, a return biasing member 46, an actuator mechanism 48, and a detent assembly 50.

The shift rail 40 may be disposed inside the housing 20. In addition, the shift rail 40 may be fixedly disposed on the housing 20 as is best shown in FIG. 3. For example, the shift rail 40 may extend along a shift rail axis 60 and may not move axially along the shift rail axis 60 or rotate about the shift rail axis 60. The shift rail axis 60 may be disposed substantially parallel to the first axis 30. In at least one configuration, the shift rail 40 may have a first end 62 and a second end 64 that may be disposed opposite the first end 62. The first end 62 and the second end 64 may be fixedly positioned with respect to the housing 20 in any suitable manner. For example, the first end 62, the second end 64, or both may be received in a corresponding pocket that may be provided in the housing 20 or a mounting bracket. The shift rail 40 may be cylindrical in one or more embodiments.

Referring to FIGS. 1-3, the first shift assembly 42 may be configured to actuate a first shift collar of the drivetrain assembly 10. In at least one configuration, the first shift assembly 42 may select a drive gear ratio of the drivetrain assembly 10. For example, the first shift assembly 42 may engage a low range gear ratio or a high range gear ratio to provide a desired output gear ratio or output torque from the drivetrain assembly 10 to a traction wheel assembly. In addition, the first shift assembly 42 may move to a neutral position in which the low or high range gear ratios are not engaged and output torque is not delivered from the drivetrain assembly 10 to a traction wheel assembly. In at least one configuration, the first shift assembly 42 may include a first shift bracket 80, a first shift fork 82, a first biasing member 84, a first shift collar 86, and a first roller 88.

The first shift bracket 80 may be movably disposed on the shift rail 40. For example, the first shift bracket 80 may be configured to move in an axial direction or along the shift rail axis 60. In at least one configuration, the first shift bracket 80 may include a side wall 90, a first flange 92, and a second flange 94 as is best shown with reference to FIG. 2.

The side wall 90 may be spaced apart from the shift rail 40 and may generally extend parallel to the shift rail axis 60.

In at least one configuration, the side wall 90 may include a guide feature 100 and one or more roller mounting features 102.

The guide feature 100 may be disposed between the first flange 92 and the second flange 94. The guide feature 100 may have any suitable configuration. In the configuration shown, the guide feature 100 has a female configuration and may be configured as a slot that may extend at least partially through the side wall 90. The guide feature 100 may cooperate with an alignment feature of the first shift fork 82 to inhibit rotation of the first shift bracket 80 as will be discussed in more detail below.

One or more roller mounting features 102 may be provided with the side wall 90. A roller mounting feature 102 may facilitate mounting of a roller, such as the first roller 88. In the configuration shown, two roller mounting features 102 are provided that are disposed at opposite ends of the side wall 90 near the first flange 92 and the second flange 94. Such a configuration may allow a common shift bracket designed to be employed with both the first shift assembly 42 and the second shift assembly 44.

The first flange 92 may extend from the side wall 90 and may facilitate mounting of the first shift bracket 80 to the shift rail 40. In at least one configuration, the first flange 92 may extend from a first end of the side wall 90 and may be disposed substantially perpendicular to the shift rail axis 60. The first flange 92 may define a first opening 110 through which the shift rail 40 may extend.

The second flange 94 may extend from the side wall 90 and may also facilitate mounting of the first shift bracket 80 to the shift rail 40. In at least one configuration, the second flange 94 may extend from a second end of the side wall 90 and may be disposed substantially perpendicular to the shift rail axis 60. As such, the second flange 94 may be spaced apart from the first flange 92 and may be disposed at an opposite end of the side wall 90 from the first flange 92 in one or more configurations. The second flange 94 may define a second opening 112 through which the shift rail 40 may extend. In addition, the second flange 94 may be a mirror image of the first flange 92.

The first shift fork 82 may be movably disposed on the shift rail 40. For example, the first shift fork 82 may be movable with respect to the shift rail 40 and the first shift bracket 80. In at least one configuration, the first shift fork 82 may include a body 120 and a fork portion 122.

The body 120 may facilitate mounting of the first shift fork 82 to the shift rail 40. For example, the body 120 may have a generally cylindrical configuration that may have a first end surface 130 and a second end surface 132. The body 120 may define a hole 134 that may extend from the first end surface 130 to the second end surface 132. The shift rail 40 may extend through the hole 134. As is best shown with reference to FIG. 2, one or more bearings 136 may be received in the hole 134 and may extend around the shift rail 40 to facilitate axial movement of the first shift fork 82 with respect to the shift rail 40.

The body 120 may also include an alignment feature 138. The alignment feature 138 may connect the first shift fork 82 to the first shift bracket 80 to limit rotation of the first shift fork 82 about the shift rail axis 60 with respect to the first shift bracket 80. In the configuration shown, the alignment feature 138 is configured as a protrusion that protrudes from the body 120. The alignment feature 138 may be received in the guide feature 100 of the first shift bracket 80. As such, the alignment feature 138 may engage one or more surfaces of the first shift bracket 80 that define the guide feature 100 to inhibit rotation of the first shift bracket 80 about the shift rail axis 60. It is also contemplated that the guide feature 100 may be provided with a male configuration and the alignment feature 138 may be provided with a female configuration in one or more embodiments.

The fork portion 122 may extend from the body 120. For example, the fork portion 122 may extend from the body 120 in a direction that extends away from the shift rail 40 and the hole 134. The fork portion 122 may be configured to engage the first shift collar 86.

The first biasing member 84 may bias the first shift fork 82 with respect to the first shift bracket 80. More specifically, the first biasing member 84 may exert a biasing force that may bias the first shift fork 82 in a first direction along the shift rail axis 60 to address undesirable shifting resistance or a blocked shift condition as will be discussed in more detail below. The first direction may extend away from the second shift assembly 44, or to the left from the perspective shown in FIGS. 1-3. The first biasing member 84 may have any suitable configuration. For example, the first biasing member 84 may be configured as a spring and may receive the shift rail 40. The first biasing member 84 may extend from the first shift bracket 80 to the first shift fork 82. In the configuration shown, the first biasing member 84 may extend from the second flange 94 of the first shift bracket 80 to the second end surface 132 of the body 120 of the first shift fork 82.

The first shift collar 86 may be movably disposed on the shaft 22. The first shift collar 86 may include a collar hole 140, an annular groove 142, and a gear portion 144.

The collar hole 140 may be configured as a through hole through which the shaft 22 may extend. A spline 146 may be disposed in the collar hole 140. The teeth of the spline 146 may extend toward the first axis 30, may extend in an axial direction substantially parallel to the first axis 30, and may be configured to engage and mate with the teeth of the spline 32 on the shaft 22. As such, the first shift collar 86 may rotate with the shaft 22 but may move axially along the shaft 22.

The annular groove 142 may extend continuously around the first shift collar 86. The annular groove 142 may receive the fork portion 122.

The gear portion 144 may include a set of teeth that may be configured to engage corresponding teeth on a driven gear of the drivetrain assembly 10. In FIGS. 1 and 2, the teeth of the gear portion 144 are generally arranged around an outside circumference of the first shift collar 86. Alternatively, the gear portion 144 may be configured as a face gear in which teeth may be disposed along an end surface of the first shift collar 86.

The first roller 88 may be disposed on a roller mounting feature 102, such as a roller mounting feature 102 that is disposed closest to a sector cam as will be discussed in more detail below. The first roller 88 may be rotatable about a first roller axis 150. The first roller 88 may be secured to the first shift bracket 80 in any suitable manner.

The second shift assembly 44 may be configured to actuate a second shift collar of the drivetrain assembly 10. In at least one configuration, the second shift assembly 44 may select a wheel drive operating mode of the drivetrain assembly 10. For example, the second shift assembly 44 may direct torque to one or more sets of vehicle traction wheels, or selectively engage a two-wheel drive or four-wheel drive operating mode, such as by providing differential lock functionality. In at least one configuration, the second shift assembly 44 may include a second shift bracket 80', a second shift fork 82', a second biasing member 84', a second shift collar 86', and a second roller 88'.

The second shift bracket 80' may have the same configuration or a similar configuration as the first shift bracket 80. As such, the second shift bracket 80' may be movably disposed on the shift rail 40 and may be movable in an axial direction or along the shift rail axis 60 independent of the first shift assembly 42 and the first shift bracket 80. In at least one configuration, the second shift bracket 80' may include a side wall 90, a first flange 92, and a second flange 94 as previously described.

The side wall 90 of the second shift bracket 80' may include a guide feature 100 and one or more roller mounting features 102 as previously discussed. The guide feature 100 of the second shift bracket 80' may cooperate with an alignment feature of the second shift fork 82' to inhibit rotation of the second shift bracket 80' about the shift rail axis 60. A roller mounting feature 102 may facilitate mounting of a roller, such as the second roller 88'.

The first flange 92 and the second flange 94 may extend from the side wall 90 and may facilitate mounting of the second shift bracket 80' to the shift rail 40, such as with first and second openings 110, 112 as previously discussed.

The second shift fork 82' may have the same configuration or a similar configuration as the first shift fork 82. For example, the second shift fork 82' may have the same configuration as the first shift fork 82, but may be rotated 180° when installed on the shift rail 40 as compared to the first shift fork 82. As such, the second shift fork 82' may be movable with respect to the shift rail 40 and the second shift bracket 80'. In at least one configuration, the second shift fork 82' may include a body 120 and a fork portion 122.

The body 120 may facilitate mounting of the second shift fork 82' to the shift rail 40. The shift rail 40 may extend through the hole 134 in the body. One or more bearings 136 may be received in the hole 134 and may extend around the shift rail 40 to facilitate axial movement of the second shift fork 82' with respect to the shift rail 40.

The alignment feature 138 of the second shift fork 82' may connect the second shift fork 82' to the second shift bracket 80' to limit rotation of the second shift fork 82' about the shift rail axis 60 with respect to the second shift bracket 80' in the same manner or a similar manner as the alignment feature of the first shift fork 82. The fork portion 122 of the second shift fork 82' may be configured to engage the second shift collar 86'.

The second biasing member 84' may bias the second shift fork 82' with respect to the second shift bracket 80'. More specifically, the second biasing member 84' may exert a biasing force that may bias the second shift fork 82' in a second direction along the shift rail axis 60 to address undesirable shifting resistance or a blocked shift condition as will be discussed in more detail below. The second direction may extend away from the first shift assembly 42 or to the right from the perspective shown in FIGS. 1-3, and may be disposed opposite the first direction in which the first biasing member 84 biases the first shift fork 82. The second biasing member 84' may have any suitable configuration and may have the same configuration as the first biasing member 84. As such, the second biasing member 84' may extend from the second shift bracket 80' to the second shift fork 82'. In the configuration shown, the second biasing member 84' may extend from the first flange 92 of the second shift bracket 80' to the second end surface 132 of the body 120 of the second shift fork 82'.

The second shift collar 86' may be movably disposed on the shaft 22. The second shift collar 86' may include a collar hole 140, an annular groove 142, and a gear portion 144 as previously described, but may have a shorter axial length than the first shift collar 86. The annular groove 142 of the second shift collar 86' may receive the fork portion 122 of the second shift fork 82'. The gear portion 144 may include a set of teeth that may be configured to engage corresponding teeth on a differential lock gear or differential case of the drivetrain assembly 10.

The second roller 88' may be disposed on a roller mounting feature 102, such as a roller mounting feature 102 that is disposed closest to a sector cam as will be discussed in more detail below. The second roller 88' may be rotatable about a second roller axis 150', which may be disposed substantially parallel to the first roller axis 150.

Referring to FIGS. 1-3, the return biasing member 46 may be configured to bias the second shift assembly 44 toward the first shift assembly 42, or to the left from the perspective shown. The return biasing member 46 may have any suitable configuration. For example, the return biasing member 46 may be configured as a spring, such as a coil spring that may disposed around the shift rail 40. In addition, the return biasing member 46 may be disposed between the housing 20 and the second shift assembly 44. For instance, the return biasing member 46 may extend from the housing 20 to the second flange 94 of the second shift bracket 80' of the second shift assembly 44.

The actuator mechanism 48 may be configured to actuate the first shift assembly 42, the second shift assembly 44, or both. As is best shown in FIGS. 1 and 2, the actuator mechanism 48 may include an actuator 160 and a sector cam 162.

Referring to FIG. 1, the actuator 160 may be configured to rotate the sector cam 162 about a sector cam axis 164. The sector cam axis 164 may be disposed substantially perpendicular to the shift rail axis 60. The actuator 160 is shown in phantom in FIG. 1 to better depict the sector cam 162. The actuator 160 may be of any suitable type, such as a pneumatic, hydraulic, mechanical, electrical, or electromechanical actuator. In at least one configuration. the actuator 160 may have an actuator shaft 166 that may operatively connect the actuator 160 to the sector cam 162. The actuator 160 may or may not have braking capability that may be employed to inhibit rotation of the actuator shaft 166 or hold the actuator shaft 166 in a desired position. Operation of the actuator 160, and hence rotation of the actuator shaft 166 and sector cam 162, may be based on an input or input signal from a vehicle operator, from a control system or controller 168, or both. As an example, an input signal may be received from an input device, such as a shift lever or button, or may be generated by the controller 168, to facilitate selection of a wheel drive mode and/or shift between the low range and high range gear ratios and a neutral position.

The sector cam 162 may be fixedly coupled to the actuator shaft 166. As such, the sector cam 162 may rotate about the sector cam axis 164 with the actuator shaft 166. The sector cam 162 may be coupled to the actuator shaft 166 in any suitable manner. For example, the sector cam 162 may include a hole that may receive the actuator shaft 166. The actuator shaft 166 may be press fit into the hole or secured to the sector cam 162 in any suitable manner, such as with one or more fasteners like a snap ring, weld, adhesive, or other bonding technique. The sector cam 162 may resemble a sector of a circle and may have an arcuate exterior surface. The sector cam 162 may include a cam window 170, a first cam surface 172, a second cam surface 174, and a set of notches 176.

The cam window 170 may be disposed within the sector cam 162. For example, the cam window 170 may be configured as a through hole that may be completely defined within the sector cam 162. The cam window 170 may receive a portion of the first shift assembly 42, such as the first roller 88. In at least one configuration, the cam window 170 may be generally disposed near the middle of the sector cam 162 and may be generally disposed between the sector cam axis 164 and the set of notches 176.

The first cam surface 172 may at least partially define the cam window 170. The first cam surface 172 may guide movement of the first shift assembly 42 when the sector cam 162 is rotated. More specifically, the first cam surface 172 may engage the first roller 88 and guide movement between points A, B, C and D when the sector cam 162 is rotated as is best shown in FIGS. 3-6 and as will be discussed in more detail below. The first cam surface 172 may be convex from point A to point B and may be generally concave from point B to point D in one or more embodiments.

The second cam surface 174 may be spaced apart the first cam surface 172 and may have a different configuration than the first cam surface 172. The second cam surface 174 may guide movement of the second shift assembly 44 when the sector cam 162 is rotated. More specifically, the second cam surface 174 may engage the second roller 88' and guide movement between points A', B', C', and D' when the sector cam 162 is rotated as will be discussed in more detail below. The second cam surface 174 may be concave from point A' to point C' and may be generally convex from point B' to point D' in one or more embodiments.

The set of notches 176 may be arranged along an exterior surface of the sector cam 162, such as along an arcuate exterior surface. The members of the set of notches 176 may be spaced apart from each other and may be configured as indentations that may be generally concave. As is best shown in FIG. 3, four notches may be provided. For convenience in reference, these notches are labeled 1-4. Each member of the set of notches 176 may correspond with a different combination of operation modes of the drivetrain assembly 10 as will be discussed in more detail below.

Referring to FIGS. 1 and 2, the detent assembly 50 may help control movement of the sector cam 162. In at least one configuration, the detent assembly 50 may include a detent actuator 180 and a detent feature 182.

The detent actuator 180 may be configured to move the detent feature 182 between a retracted position and an extended position. In the retracted position, the detent feature 182 may be spaced apart from the sector cam 162. In the extended position, the detent feature 182 may engage the sector cam 162 and may be received in a member of the set of notches 176 depending on the rotational position of the sector cam 162. The detent actuator 180 may exert sufficient force to inhibit rotation of the sector cam 162 when the detent feature 182 is received in a notch 176. The detent actuator 180 may be of any suitable type, such as a pneumatic, hydraulic, mechanical, electrical, or electromechanical actuator. In at least one configuration, the detent actuator 180 may be a solenoid in which the detent feature 182 is actuated toward the retracted position when power is not provided to the solenoid and actuated toward the extended position when power is provided to energize the solenoid coils. Alternatively, it is contemplated that the detent actuator 180 may be actuated toward the retracted position when power is provided in one or more embodiments. The detent actuator 180 may also be configured as a spring or linear actuator in various embodiments. The detent actuator 180 may be mounted to the housing 20.

The detent feature 182 may be coupled to the detent actuator 180. The detent feature 182 may be configured to be received in a member of the set of notches 176 to inhibit rotation of the sector cam 162 and may be spaced apart from or may slide along an arcuate exterior side 190 of the sector cam 162 between the notches 176 when the sector cam 162 is rotated and a notch 176 is not aligned with the detent feature 182.

Referring to FIGS. 3-6, operation modes of the drivetrain assembly 10 will now be discussed in more detail.

In FIG. 3, the shift mechanism 24 is shown in a first position. In the first position, the detent feature 182 may be received in notch 1, the first shift assembly 42 may be positioned such that a low range gear ratio is engaged via the first shift collar 86, and the second shift assembly 44 may be positioned such that a four-wheel drive operating mode is selected in which torque is directed to multiple sets of vehicle traction wheels via the second shift collar 86'. The first roller 88 is disposed at point A. The second roller 88' is disposed at point A'.

Figure 4:
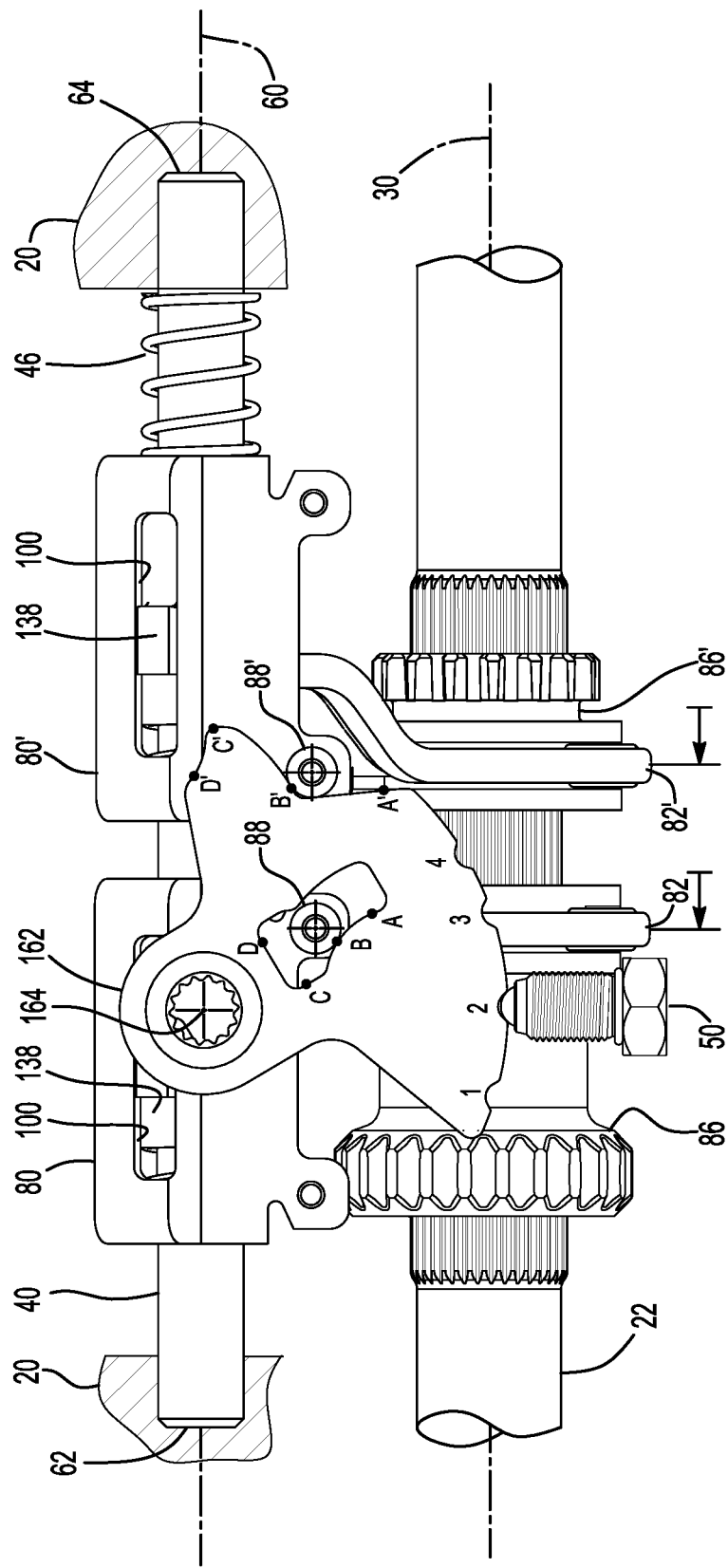
FIG. 4 is a side view illustrating the shift mechanism in a second position.

In FIG. 4, the shift mechanism 24 is shown in a second position. In the second position, the first shift assembly 42 may be positioned in a neutral position in which the low and high range gear ratios are not engaged via the first shift collar 86 and the second shift assembly 44 may be positioned such that a two-wheel drive mode is selected via the second shift collar 86'. As compared with FIG. 3, the sector cam 162 is rotated clockwise about the sector cam axis 164 so that the detent feature 182 is received in notch 2. The first roller 88 moves along the first cam surface 172 from point A to point B, thereby allowing the first shift assembly 42 to move to the left from the perspective shown. The second roller 88' moves along the second cam surface 174 from point A' to point B', thereby allowing the second shift assembly 44 to move to the left from the position shown in FIG. 3 under the biasing force of the return biasing member 46.

Figure 5:
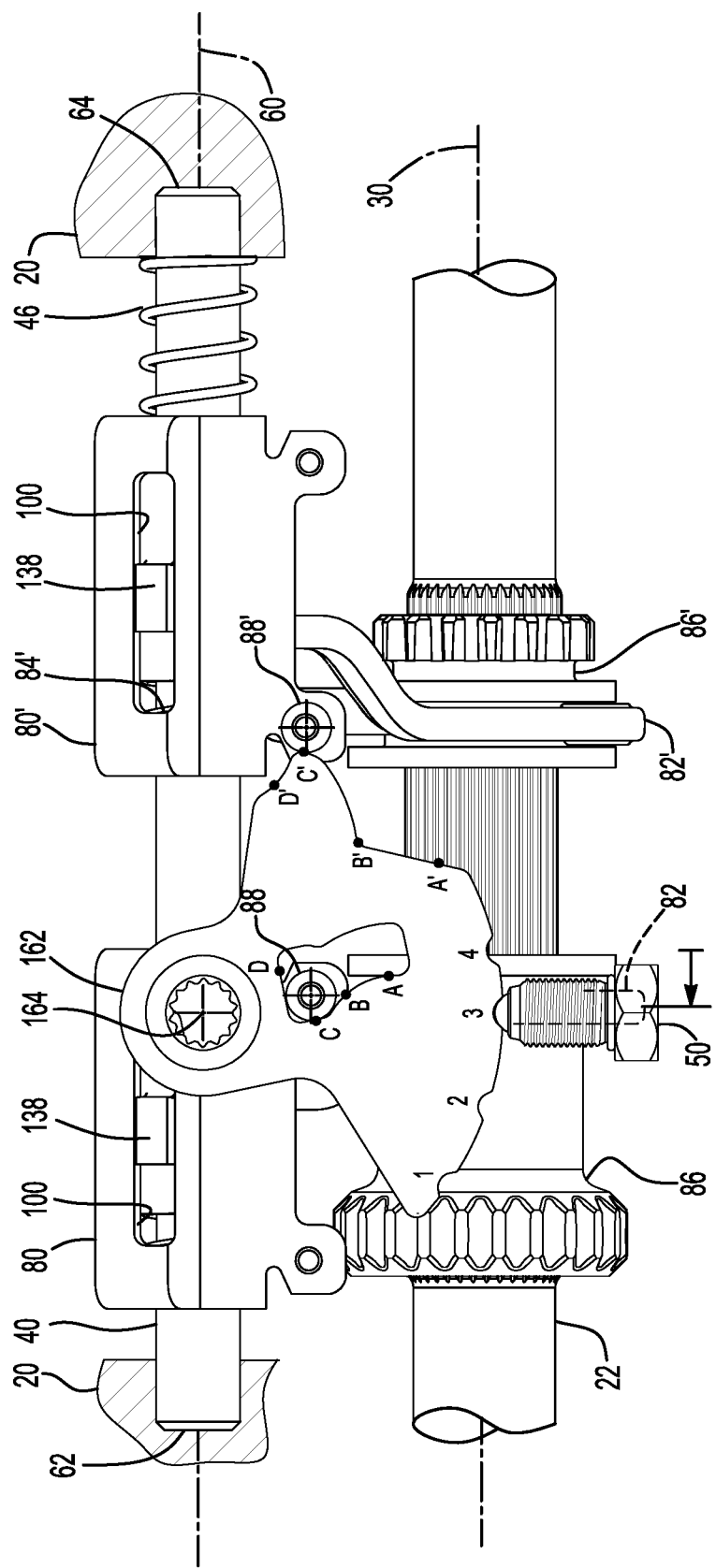
FIG. 5 is a side view illustrating the shift mechanism in a third position.

In FIG. 5, the shift mechanism 24 is shown in a third position. In the third position, the first shift assembly 42 may be positioned such that a high range gear ratio is engaged via the first shift collar 86 and the second shift assembly 44 may be positioned such that a four-wheel drive mode is selected via the second shift collar 86'. In the high range gear ratio, the first shift collar 86 may be disengaged from a planet gear carrier of the planetary gear set and may engage the sun gear of the planetary gear set or otherwise be positioned such that torque may be transmitted from the input shaft to the shaft 22 via the sun gear. As compared with FIG. 4, the sector cam 162 is rotated clockwise about the sector cam axis 164 and the detent feature 182 may be received in notch 3. The first roller 88 moves along the first cam surface 172 from point B to point C, thereby allowing the first shift assembly 42 to move to the left from the position shown in FIG. 4. The second roller 88' moves along the second cam surface 174 from point B' to point C', thereby actuating the second shift assembly 44 to the right from the position shown in FIG. 4 as force exerted by the sector cam 162 against the second shift assembly 44 overcomes the biasing force of the return biasing member 46. As such, the second shift assembly 44 and second shift collar 86' may be in the same position in FIGS. 3 and 5.

Figure 6:
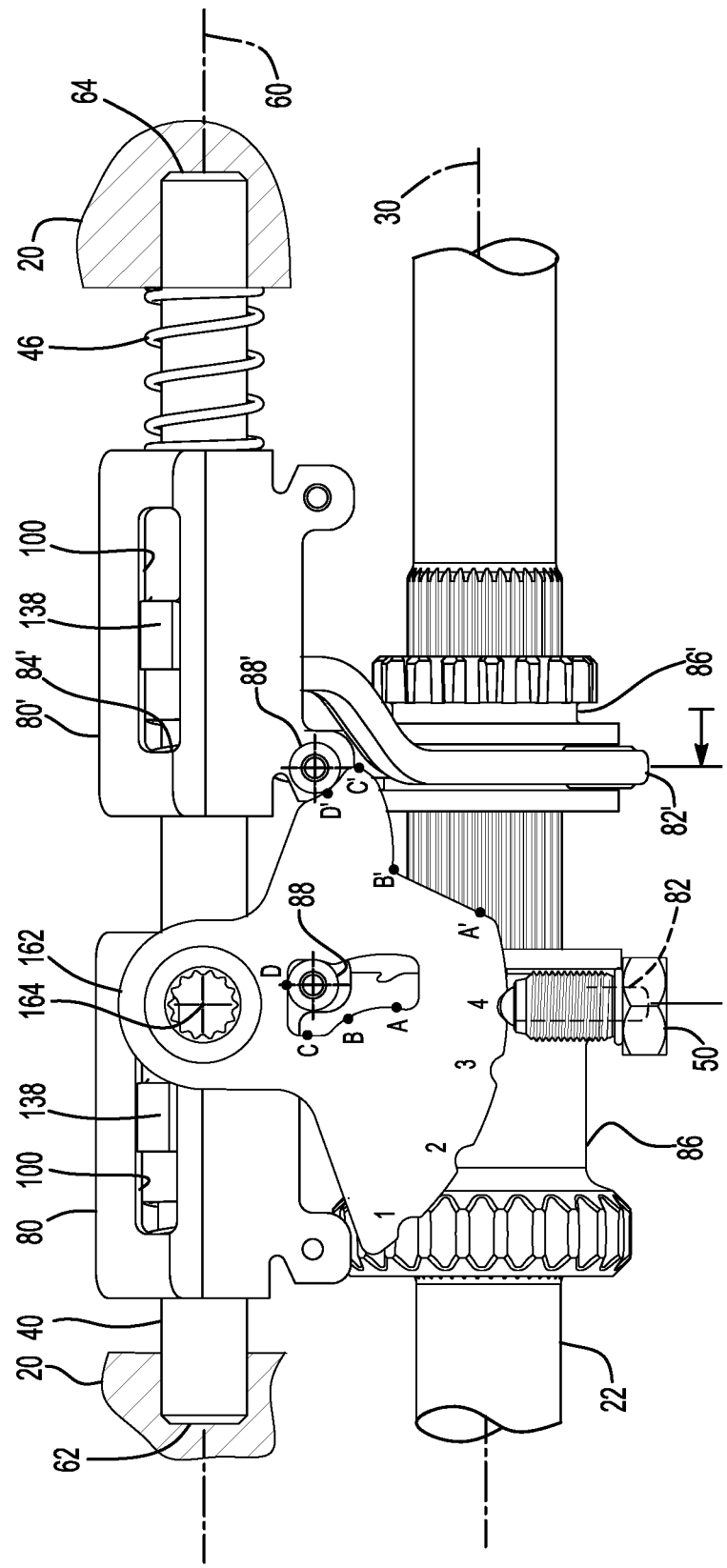
FIG. 6 is a side view illustrating the shift mechanism in a fourth position.

In FIG. 6, the shift mechanism 24 is shown in a fourth position. In the fourth position, the first shift assembly 42 may be positioned such that a high range gear ratio is engaged via the first shift collar 86 and the second shift assembly 44 may be positioned such that a two-wheel drive mode is selected via the second shift collar 86'. As compared with FIG. 5, the sector cam 162 is rotated clockwise about the sector cam axis 164 and the detent feature 182 is received in notch 4. The first roller 88 moves along the first cam surface 172 from point C to point D, thereby allowing the first shift assembly 42 and first shift collar 86 to remain stationary or substantially stationary in an axial direction. The second roller 88' moves along the second cam surface 174 from point C' to point D', thereby allowing the second shift assembly 44 to move to the left from the position shown in FIG. 5 under the biasing force of the return biasing member 46. As such, the second shift assembly 44 and second shift collar 86' may be in the same position in FIGS. 4 and 6.

The first shift collar 86, the second shift collar 86', or both may encounter a blocked shift condition during operation.

A blocked shift condition may exist when the teeth of the gear portion 144 of the first shift collar 86 are misaligned with corresponding teeth on a mating gear that may be engaged to provide the low range gear ratio or the high range gear ratio. For example, the first shift collar 86 and the first shift fork 82 may be inhibited from moving from the neutral position to the left from the perspective shown due to tooth misalignment. In such a situation, the first biasing member 84 may allow the first roller 88 to move within the cam window 170 to permit the sector cam 162 to continue to rotate about the sector cam axis 164, which may help inhibit damage to the actuator mechanism 48. For instance, the force exerted by the sector cam 162 that actuates the first shift bracket 80 to the left may compress the first biasing member 84 when the first shift collar 86 is blocked or inhibited from moving to the left from the perspective shown. The biasing force exerted by the first biasing member 84 may then actuate the first shift fork 82 to the left relative to the first shift bracket 80 from the perspective shown when the blocked shift condition is alleviated.

A blocked shift condition may also exist when the teeth of the gear portion 144 of the second shift collar 86' are misaligned with corresponding teeth on a mating gear, such as teeth of a differential lock gear, that may be engaged to provide the four-wheel drive mode. As such, the second shift collar 86' and the second shift fork 82' may be inhibited from moving axially to the right from the perspective shown due to tooth misalignment. In such a situation, the second biasing member 84' may allow the second roller 88' to move along the second cam surface 174 to permit the sector cam 162 to continue to rotate about the sector cam axis 164, which may help inhibit damage to the actuator mechanism 48. For example, the force exerted by the sector cam 162 that actuates the second shift bracket 80' to the right may compress the second biasing member 84' when the second shift collar 86' is blocked or inhibited from moving to the right from the perspective shown. The biasing force exerted by the second biasing member 84' may then actuate the second shift fork 82' to the right relative to the second shift bracket 80' from the perspective shown when the blocked shift condition is alleviated.

The configurations described above may allow a shift mechanism to be provided with a stationary shift rail, which may eliminate components that may otherwise be provided to actuate the shift rail. In addition, the configurations described above may allow a shift mechanism to be provided with shift plates, shift forks, biasing members, bushings, rollers, or combinations thereof that have common designs for multiple shift assemblies, thereby helping reduce reducing costs and manufacturing complexity. In addition, the configurations described above may allow shifts to be completed when blocked shift conditions occur with either shift assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drivetrain assembly comprising:
   a housing; and
   a shift mechanism that includes:
      a shift rail that is fixedly disposed on the housing;
      a first shift assembly that is moveable along a shift rail axis with respect to the shift rail, wherein the first shift assembly includes a first shift bracket and a first shift fork, wherein the first shift bracket includes a side wall, a first flange that extends from the side wall, and a second flange that extends from the side wall and is spaced apart from the first flange, the side wall includes a guide feature that is disposed between the first flange and the second flange, and the first shift fork has an alignment feature that is received in the guide feature of the first shift bracket to limit rotation of the first shift fork about the shift rail axis;
      a second shift assembly that is moveable along the shift rail axis with respect to the shift rail, wherein the second shift assembly includes a second shift bracket and a second shift fork, wherein the second shift bracket includes a side wall, a first flange that extends from the side wall, and a second flange that extends from the side wall and is spaced apart from the first flange, the side wall includes a guide feature that is disposed between the first flange and the second flange, and the second shift fork has an alignment feature that is received in the guide feature of the second shift bracket to limit rotation of the second shift fork about the shift rail axis; and
      a sector cam that is rotatable about a sector cam axis, wherein the sector cam controls movement of the first shift assembly and the second shift assembly.

2. The drivetrain assembly of claim 1 further comprising a return biasing member that extends from the housing to the second shift assembly and biases the second shift assembly toward the first shift assembly.

3. The drivetrain assembly of claim 1 wherein the first shift bracket is moveable with respect to the shift rail and the first shift fork is moveable with respect to the shift rail and the first shift bracket.

4. The drivetrain assembly of claim 3 wherein the shift rail extends through the first shift bracket and the first shift fork.

5. The drivetrain assembly of claim 3 wherein the shift rail extends through the first flange and the second flange of the first shift bracket.

6. The drivetrain assembly of claim 5 further comprising a first biasing member that extends from the first shift bracket to the first shift fork, wherein the first biasing member biases the first shift fork away from the second shift assembly.

7. The drivetrain assembly of claim 6 wherein the first biasing member extends from the second flange of the first shift bracket to the first shift fork.

8. The drivetrain assembly of claim 5 wherein the alignment feature of the first shift fork is moveably disposed in the guide feature of the first shift bracket.

9. The drivetrain assembly of claim 3 wherein the wherein the second shift bracket is moveable with respect to the shift rail and the second shift fork is moveable with respect to the shift rail and the second shift bracket.

10. The drivetrain assembly of claim 9 wherein the shift rail extends through the second shift bracket and the second shift fork.

11. The drivetrain assembly of claim 9 wherein the first shift assembly includes a first roller that is rotatably disposed on the first shift bracket and that engages the sector cam and the second shift assembly includes a second roller that is rotatably disposed on the second shift bracket and that engages the sector cam.

12. The drivetrain assembly of claim 9 wherein the shift rail extends through the first flange and the second flange of the second shift bracket.

13. The drivetrain assembly of claim 12 further comprising a second biasing member that extends from the second shift bracket to the second shift fork, wherein the second biasing member biases the second shift fork away from the first shift assembly.

14. The drivetrain assembly of claim 13 wherein the second biasing member extends from the second flange of the second shift bracket to the second shift fork.

15. The drivetrain assembly of claim 13 wherein the alignment feature of the second shift fork is moveably disposed in the guide feature of the second shift bracket.

16. The drivetrain assembly of claim 13 wherein a first biasing member biases the first shift fork away from the second shift fork and the second biasing member biases the second shift fork away from the first shift fork.

17. A drivetrain assembly comprising:
   a housing; and
   a shift mechanism that includes:
      a shift rail that is fixedly disposed on the housing and extends along a shift rail axis;
      a first shift assembly that is moveable along the shift rail axis with respect to the shift rail, wherein the first shift assembly has a first shift bracket that includes a side wall, a first flange that extends from the side wall, and a second flange that extends from the side wall and is spaced apart from the first flange, the side wall includes a guide feature that is disposed between the first flange and the second flange, a first shift fork that has an alignment feature that extends away from and does not engage the shift rail and is received in the guide feature of the first shift bracket to limit rotation of the first shift fork about the shift rail axis, and a first biasing member that biases the first shift fork in a first direction along the shift rail axis;
      a second shift assembly that is moveable along the shift rail axis with respect to the shift rail, wherein the second shift assembly has a second shift bracket and a second shift fork, wherein the second shift bracket includes a side wall, a first flange that extends from the side wall, and a second flange that extends from the side wall and is spaced apart from the first flange, the side wall includes a guide feature that is disposed between the first flange and the second flange, a second shift fork that has an alignment feature that that extends away from and does not engage the shift rail and is received in the guide feature of the second shift bracket to limit rotation of the second shift fork about the shift rail axis, and a second biasing member that biases the second shift fork in a second direction along the shift rail axis; and a sector cam that is rotatable about a sector cam axis and configured to actuate the first shift assembly and the second shift assembly.

18. The drivetrain assembly of claim 17 further comprising a return biasing member that biases the second shift assembly in the first direction along the shift rail axis.

19. The drivetrain assembly of claim 18 wherein the shift rail extends through the first flange and the second flange of the second shift assembly and the second biasing member extends from the first flange of the second shift bracket to a second end surface of a body of the second shift fork and the shift rail and the return biasing member extends from the housing to the second flange of the second shift assembly.

20. The drivetrain assembly of claim 17 wherein the first shift assembly engages a low range gear ratio and the second shift assembly engages a four-wheel drive mode when the sector cam is in a first position, the first shift assembly is in a neutral position when the sector cam is in a second position, the first shift assembly engages a high range gear ratio and the second shift assembly engages the four-wheel drive mode when the sector cam is in a third position, and the first shift assembly engages the high range gear ratio and the second shift assembly engages a two-wheel drive mode when the sector cam is in a fourth position.

* * * * *